(12) United States Patent
Chen et al.

(10) Patent No.: US 8,244,002 B2
(45) Date of Patent: Aug. 14, 2012

(54) SYSTEM AND METHOD FOR PERFORMING RAPID FACIAL RECOGNITION

(75) Inventors: Jian-Ren Chen, Hsinchu County (TW); Leii H. Chang, Hsinchu County (TW); Yi-Fei Luo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 556 days.

(21) Appl. No.: 12/563,329

(22) Filed: Sep. 21, 2009

(65) Prior Publication Data

US 2010/0239130 A1    Sep. 23, 2010

(30) Foreign Application Priority Data

Mar. 18, 2009 (TW) .............................. 98108830 A (51) Int. Cl.
*G06K 9/00* (2006.01)
*G06F 21/00* (2006.01)
(52) U.S. Cl. ........................................ 382/118; 713/186
(58) Field of Classification Search .................. 382/103, 382/118; 713/186
See application file for complete search history.

(56) References Cited

U.S. PATENT DOCUMENTS

| | | | |
|---|---|---|---|
| 4,989,813 A | 2/1991 | Kim et al. | |
| 5,110,986 A | 5/1992 | Kelly | |
| 6,697,504 B2 | 2/2004 | Tsai | |
| 7,003,135 B2 | 2/2006 | Hsieh et al. | |
| 7,346,186 B2 | 3/2008 | Sharoni et al. | |
| 7,634,662 B2 * | 12/2009 | Monroe | 713/186 |
| 2007/0091883 A1 | 4/2007 | Wee et al. | |
| 2007/0091884 A1 | 4/2007 | Wee et al. | |

FOREIGN PATENT DOCUMENTS

| | | |
|---|---|---|
| TW | 147927 | 12/1990 |
| TW | 152862 | 3/1991 |
| TW | 165076 | 8/1991 |
| TW | 466452 | 12/2001 |
| TW | 477959 | 3/2002 |
| TW | 505892 | 10/2002 |

OTHER PUBLICATIONS

English abstract of TW505892, pub. Oct. 11, 2002.
English abstract of TW147927, pub. Dec. 21, 1990.
English abstract of TW165076, pub. Aug. 1, 1991.
English abstract of TW477959, pub. Mar. 1, 2002.
English abstract of TW466452, pub. Dec. 1, 2001.
English abstract of TW152862, pub. Mar. 1, 1991.

* cited by examiner

*Primary Examiner* — Vu Le
*Assistant Examiner* — Amara Abdi
(74) *Attorney, Agent, or Firm* — Thomas|Kayden (57) ABSTRACT

A system and a method for performing rapid facial recognition are provided. The rapid facial recognition system includes an image capture device, a broadcasting feature computing unit and several response recognition computing units scattered on the network. Each of the broadcasting feature computing unit and the response recognition computing units includes a feature recognition module, wherein the broadcasting feature computing unit further includes a feature extraction module and an identification module. The image capture device captures a facial image, and the feature extraction module extracts features of the facial image to generate a set of feature data that is broadcasted to the response recognition computing units. The feature recognition modules, in accordance with the set of the feature data and their classes allocated, perform distributed facial recognition for generating recognition results as a response. The identification module identifies the recognition results to accomplish the recognition of an individual's identity.

20 Claims, 6 Drawing Sheets

SYSTEM AND METHOD FOR PERFORMING RAPID FACIAL RECOGNITION

This application claims the benefit of Taiwan application Serial No. 98108830, filed Mar. 18, 2009, the subject matter of which is incorporated herein by reference.

BACKGROUND OF THE INVENTION

1. Field of the Invention

The invention relates in general to a system and a method for performing rapid facial recognition, and more particularly to a system which performs distributed processing through the feature recognition modules of a plurality of computing units and their classes allocated and a method for performing rapid facial recognition.

2. Description of the Related Art

Facial recognition, which has attracted a lot of attention from both the academic arena and the industry in recent years, has achieved great performance in the application of public safety and access security control. Comparing with the conventional access security control, the technology of facial recognition has the advantages of better protection, higher efficiency and easier solution to the misplacement of access card. Meanwhile, comparing with other bio-recognition, facial recognition being non-invasive and non-contact is easy for people to be accepted. Particularly, when the user's both hands are occupied and are unable to swipe the access card or input the passwords, the advantages of the facial recognition technology will be appreciated.

A parallel processing block diagram is disclosed in FIG. 2 of US Patent 2007/0091884 A1. Data are divided into two parts and respectively transferred to different computing units for computing. Lastly, the results are transmitted to and displayed at the user end.

The block diagram disclosed in FIG. 1 of US Patent 2007/0091883 A1 differs with the structure disclosed in United States Patent Publication No. US2007/091884 A1 in that data can be exchanged among the computing units engaged in parallel computing. For example, data are transmitted to a target unit from a first unit, then the data are computed by the target unit, and the results are further transmitted to the next unit for subsequent processing until the final result is accomplished. Both the present patent and the previous patent perform distributed processing on a large volume of data at a high speed and balance the work load of different units.

According to the block diagram disclosed in FIG. 1 of U.S. Pat. No. 7,346,186, each image capture unit is equipped with an image processing unit, which analyzes image and then saves or transmits the original data and the result of analysis together to a central control unit. The part of the image processing unit only performs analyzing and processing tasks for the image captured by the image capture device connected thereto without performing the division of labor.

A system and method for rapidly tracking multiple faces are disclosed in FIG. 1 of Taiwan Patent 165076 (corresponding to U.S. Pat. No. 7,003,135). The method uses a face-like region generator to find a face-like region by skin color, motion and silhouette information. A face status checker compares the face-like region with all tracked faces recorded in a face recorder for determining whether the face-like regions are an old faces tracked in a previous frame or possible new faces. Lastly, a face tracking engine performs multiple face tracking according to the new faces and old faces, and the information such as skin color and region provided by the face-like region generator. Before the time-consuming facial recognition is performed, the technology filters the face data by information such as skin color, motion and silhouette, and classifies the face data into old faces (the faces being recognized) and new faces (the faces not yet being recognized), and verifies the new faces only.

A multi-level facial image recognition method is disclosed in FIG. 1 of Taiwan Patent 152862 (corresponding to U.S. Pat. No. 6,697,504). The method uses a quadrature mirror filter to decompose an image into at least two sub-images having different resolution levels by multi-resolution decomposing method. The testing starts with the lowest resolution level. If the face data is unrecognizable at a low resolution level, then the face data is recognized at a higher level of resolution.

As disclosed in FIG. 1 of Taiwan Patent 147927, a camera disposed at a predetermined position obtains face sampling data to identify the position of the face, and further tracks the faces that need to be recognized. Whether the face is an existing face or an abnormal face is determined by sampling and analyzing the face silhouette of the faces at the checking region. Lastly, the determined face image data are stored, and the non-determined abnormal image data are directly transmitted to another set of recognition system.

SUMMARY OF THE INVENTION

The invention is directed to a system and a method for performing rapid facial recognition. Distributed facial recognition is performed by multiple feature recognition modules that are interconnected and scattered on the network, hence can greatly increase the recognition speed and decrease the requirements in hardware specification. Moreover, the recognition accuracy is further increased by employing an identification module to identify the recognition results.

According to a first aspect of the present invention, a rapid facial recognition system is provided for performing recognition in accordance with a plurality of classes. The recognition system includes at least an image capture device, a plurality of response recognition computing units and at least a broadcasting feature computing unit. The image capture device is used for capturing a facial image. Each of the response recognition computing units includes a second feature recognition module. The second feature recognition module having a part of the allocated classes is used for performing rapid facial recognition in accordance with a set of feature data and the part of the classes allocated to the second feature recognition module for rapidly generating a second recognition result. The broadcasting feature computing unit is connected to the response recognition computing unit via the network. The broadcasting feature computing unit includes a first feature extraction module, a first feature recognition module and a first identification module. The first feature recognition module having the other part of the classes is used for performing rapid facial recognition in accordance with the set of feature data and the other part of classes allocated to the first feature recognition module for rapidly generating a first recognition result. The first feature extraction module extracts features of the facial image to generate the set of feature data and further broadcast the set of feature data to the first feature recognition module and the second feature recognition module. The first identification module is used for identifying the first recognition result and the second recognition results to accomplish the recognition of an individual's identity.

According to a second aspect of the present invention, a rapid facial recognition method is provided for performing recognition according to a plurality of classes. The rapid facial recognition method includes the following steps: The computing units connected via the network are divided into at least one broadcasting feature computing unit and a plurality of response recognition computing units. The broadcasting feature computing unit captures a facial image. The broadcasting feature computing unit extracts features of the facial image to generate a set of feature data. The broadcasting feature computing unit broadcasts the set of feature data to a plurality of feature recognition modules located at the broadcasting feature computing unit and the response recognition computing units. The feature recognition modules perform rapid facial recognition in accordance with the set of feature data and the classes allocated to the feature recognition modules for generating the recognition results as a response, and further sending a set of previous space-time recognition data related to a specific class when face recognition is successful. The broadcasting feature computing unit accomplishes the recognition of an individual's identity in accordance with the recognition result and the set of previous space-time recognition data of the specific class.

The invention will become apparent from the following detailed description of the preferred but non-limiting embodiments. The following description is made with reference to the companying drawings.

DETAILED DESCRIPTION OF THE INVENTION

In the embodiments disclosed below, distributed rapid facial recognition is done by multiple interconnected computing units scattered on the network, hence can greatly increase the recognition speed. As the load of computing is shared by multiple interconnected computing units scattered on the network, the requirements of high-end features in hardware specification are largely decreased.

In the following embodiments, one of the computing units is a broadcasting feature computing unit, and the other computing units are response recognition computing units. The broadcasting feature computing unit broadcasts a set of feature data (FD) to the response recognition computing unit connected to the broadcasting feature computing unit, and then the feature recognition modules of the broadcasting feature computing unit and the response recognition computing units perform distributed computing to generate recognition results (RR) in accordance with the set of feature data and the classes allocated to the feature recognition modules. The response recognition computing units further transmit the recognition results back to the broadcasting feature computing unit so that the broadcasting feature computing unit identifies the recognition results and accomplish the recognition of an individual's identity.

Figure 1:
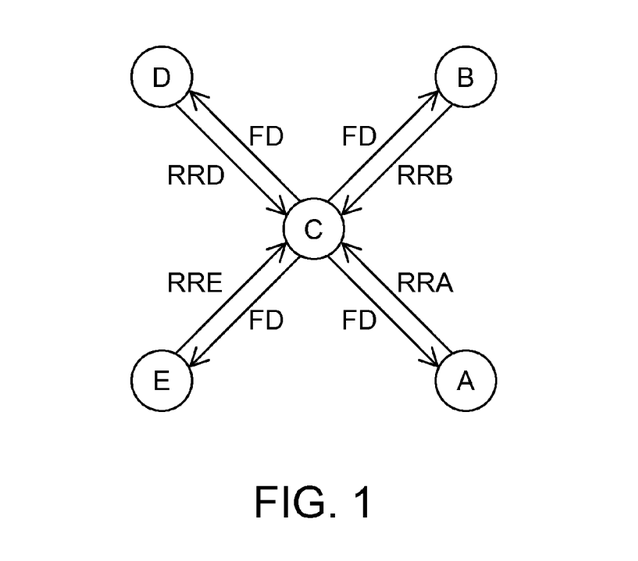
FIG. 1 shows a schematic block diagram of a rapid facial recognition system of the invention.

Rapid Facial Recognition System:

FIG. 1 is a schematic block diagram of a rapid facial recognition system of the invention. Referring to FIG. 1, five computing units A~E connected via the network are performing distributed rapid facial recognition. As the computing unit C broadcasts a set of feature data FD to the computing units A, B, D and E that are connected to the computing unit C, the computing unit C is also called a "broadcasting feature computing unit". Each of the computing units A~E has a feature recognition module, and each of the feature recognition modules performs distributed computing in accordance with the set of feature data and the classes allocated to the feature recognition modules to generate a recognition result. As the computing units A, B, D and E provide and transmit the recognition results RRA, RRB, RRD and RRE to the computing unit C, the computing units A, B, D and E are also called "response recognition computing units".

Figure 2:
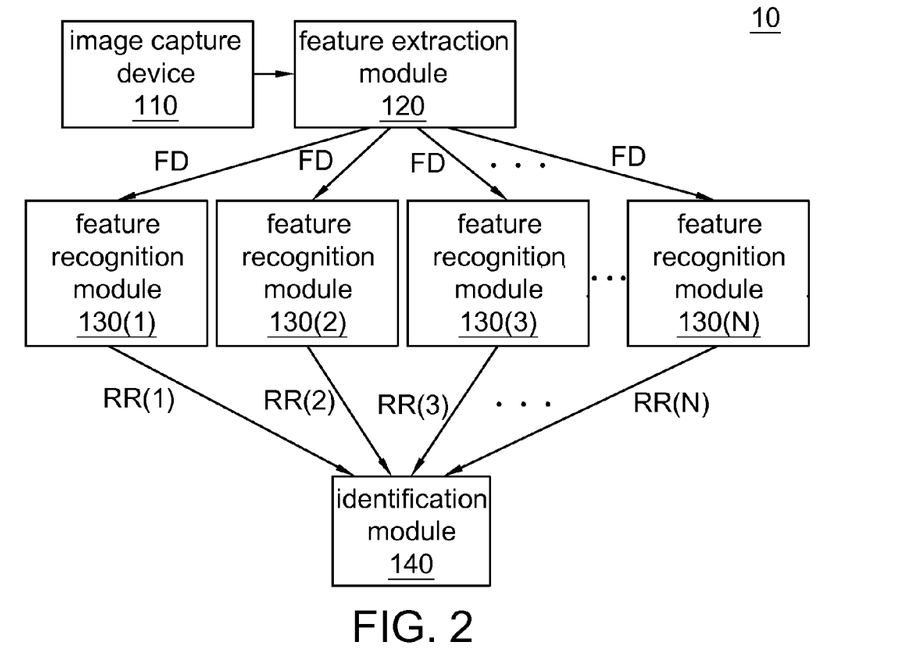
FIG. 2 shows a block diagram of a rapid facial recognition system of the invention.

FIG. 2 is a block diagram of a rapid facial recognition system of the invention. Referring to FIG. 2, the rapid facial recognition system 10 includes an image capture device 110, a feature extraction module 120, N feature recognition modules 130 (1)~130 (N) and an identification module 140, wherein, N is a positive integer greater than 1. The image capture device 110 is used for capturing a facial image, and the feature extraction module 120 extracts features of the facial image to generate a set of feature data FD. The feature extraction module 120 broadcasts the set of feature data FD to the feature recognition modules 130 (1)~130 (N). Subsequently, the feature recognition modules 130 (1)~130 (N) perform rapid facial recognition in accordance with the set of feature data FD and the classes allocated to the feature recognition modules for rapidly generating N recognition results RR (1)~RR (N). The identification module 140 further identifies the recognition results RR (1)~RR (N) to accomplish the recognition of an individual's identity.

Furthermore, the feature extraction module 120 can preprocess an image, such as a facial image for example, so as to perform color space transformation and improve image quality. The feature extraction module 120 can further locate possible face in the image by use of the face detection algorithm, wherein the face detection algorithm employs Eigenface method or skin color detection method. After the feature extraction module 120 locates the possible face, the coverage region of the face is extracted from the facial image, coped with a normalization process, and enlarged to a standard size. The feature extraction module 120 performs feature extraction to extract meaningful information from the facial image. For example, the principal components analysis (PCA) is applied to the coverage region of the face to obtain the set of feature data FD, or the kernel class-dependence feature analysis (KCFA) is applied to the coverage region of the face to filter out the set of feature data FD which is expressed in one dimension.

As the set of feature data FD is obtained by extracting features of the facial image, the data volume of the set of feature data FD is far smaller than that of the original facial image. Thus, to broadcast the set of feature data FD to the feature recognition modules 130 (1)~130 (N) located at different network nodes via the network requires less bandwidth than to broadcast the original facial image.

The N feature recognition modules 130 (1)~130 (N), for example, are classifiers constructed by the tools employing statistical method or neural network. When the set of feature data FD is inputted to each of the feature recognition modules 130 (1)~130 (N), the feature recognition modules 130 (1)~130 (N) transmit out the recognition results with class as a response if the set of feature data FD can be categorized into a class and recognized by the feature recognition modules 130 (1)~130 (N). As each class represents the identity or the identification number of a specific person, the feature recognition modules 130 (1)~130 (N) is capable of identifying the identity related to the person through the set of feature data FD in distributive manner to accomplish facial recognition.

The rapid facial recognition system 10 can perform distributed recognition through the feature recognition modules 130 (1)~130 (N) scattered on the network, hence can greatly increase the recognition speed. Besides, as the classes are allocated to the feature recognition modules 130 (1)~130 (N) by use of the roughly average method, the number of classes for a feature recognition module to recognize is largely decreased, and high-end hardware is not necessary. In addition, the feature recognition modules 130 (1)~130 (N) can exchange or reallocate their allocated classes to average the computing load of the feature recognition modules.

First Embodiment

Figure 3:
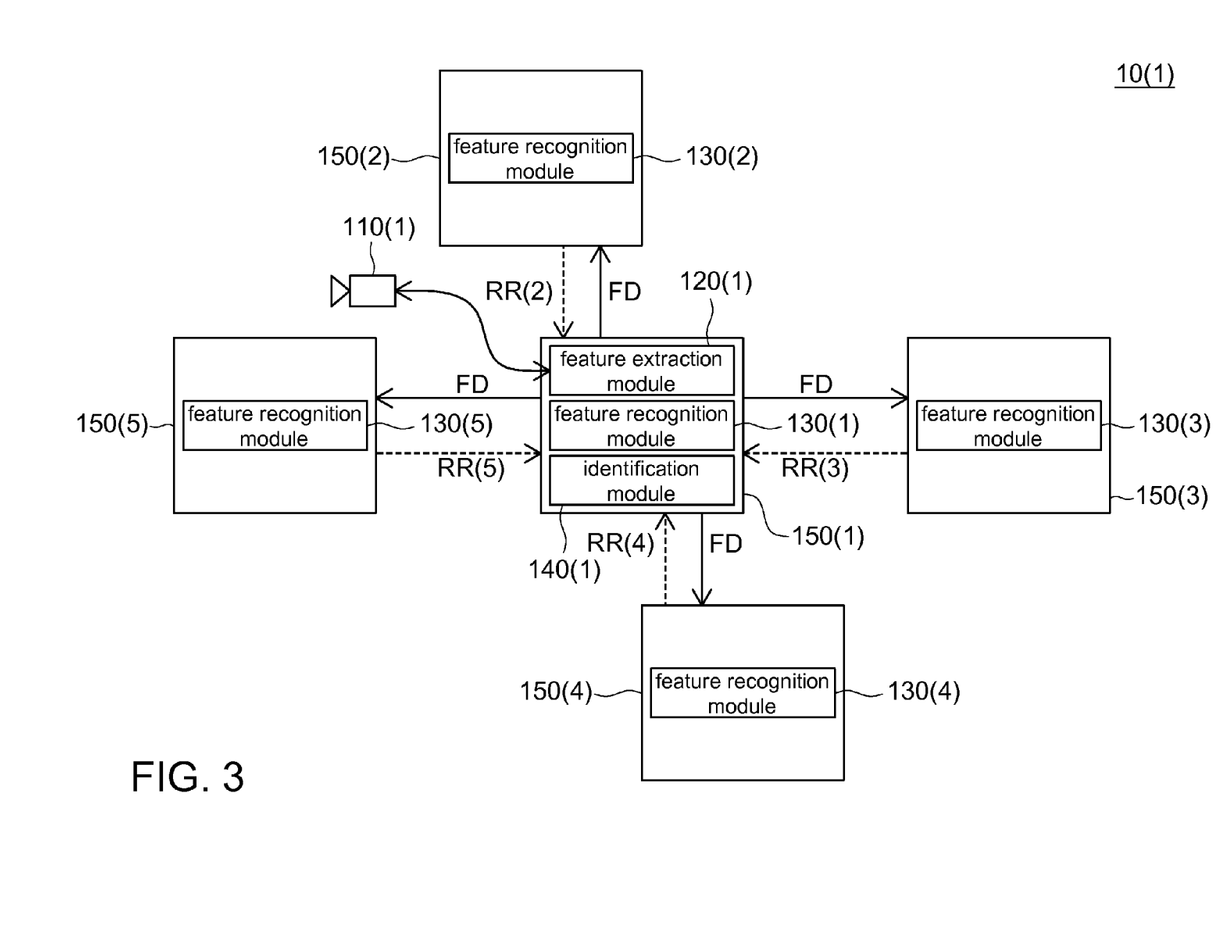
FIG. 3 shows a block diagram of a rapid facial recognition system according to a first embodiment of the invention.

FIG. 3 is a block diagram of a rapid facial recognition system according to a first embodiment of the invention. For the convenience of elaboration, in FIG. 3, the rapid facial recognition system 10 of FIG. 2 is replaced by the rapid facial recognition system 10 (1), and is exemplified by having five computing units and one image capture device. However, the invention is not limited thereto, and the number of computing units can be adjusted to fit actual needs. The rapid facial recognition system 10 (1) includes an image capture device 110 (1) and five computing units 150 (1)~150 (5). In the present embodiment, the computing unit 150 (1) includes a feature extraction module 120 (1), a feature recognition module 130 (1) and an identification module 140 (1); the four computing units 150 (2)~150 (5) include four feature recognition modules 130 (2)~130 (5) respectively. The rapid facial recognition system 10 (1) performs recognition according to a plurality of classes. A first part, a second part, a third part, a fourth part and a fifth part of the classes are allocated to the feature recognition modules 130 (1)~130 (5) respectively.

After the image capture device 110 (1) captures a facial image, the feature extraction module 120 (1) extracts features of the facial image to generate a set of feature data FD. As the computing unit 150 (1) broadcasts the set of feature data FD to the computing units 150 (2)~150 (5), the computing unit 150 (1) is also called a "broadcasting feature computing unit". The feature recognition modules 130 (1)~130 (5) respectively perform recognition on the set of feature data FD in accordance with the classes allocated to the feature recognition modules, and further provide recognition results RR (1)~RR (5) to the identification module 140 (1) as a response. As the computing units 150 (2)~150 (5) respectively provide and transmit the recognition results RR (2)~RR (5) to the computing unit 150 (1), the computing units 150 (2)~150 (5) are also called "response recognition computing units". The identification module 140 (1) further identifies the recognition results RR (1)~RR (5) to accomplish the recognition of an individual's identity. In the first embodiment, the feature extraction module 120 (1) is called a "first feature extraction module"; the feature recognition module 130 (1) is called a "first feature recognition module"; the identification module 140 (1) is called a "first identification module"; the feature recognition modules 130 (2)~130 (5) are called "second feature recognition modules"; the set of feature data FD is called "a set of feature data", the recognition result RR (1) is called a "first recognition result"; the recognition results RR (2)~RR (5) are called "second recognition results".

In the first embodiment, the response recognition computing unit only includes a feature recognition module. However, the response recognition computing unit can further include a feature extraction module and an identification module in addition to the feature recognition module. The response recognition computing unit having the feature extraction module can further be coupled to the image capture device to extract features of the facial image that is captured by the image capture device.

Second Embodiment

Figure 4:
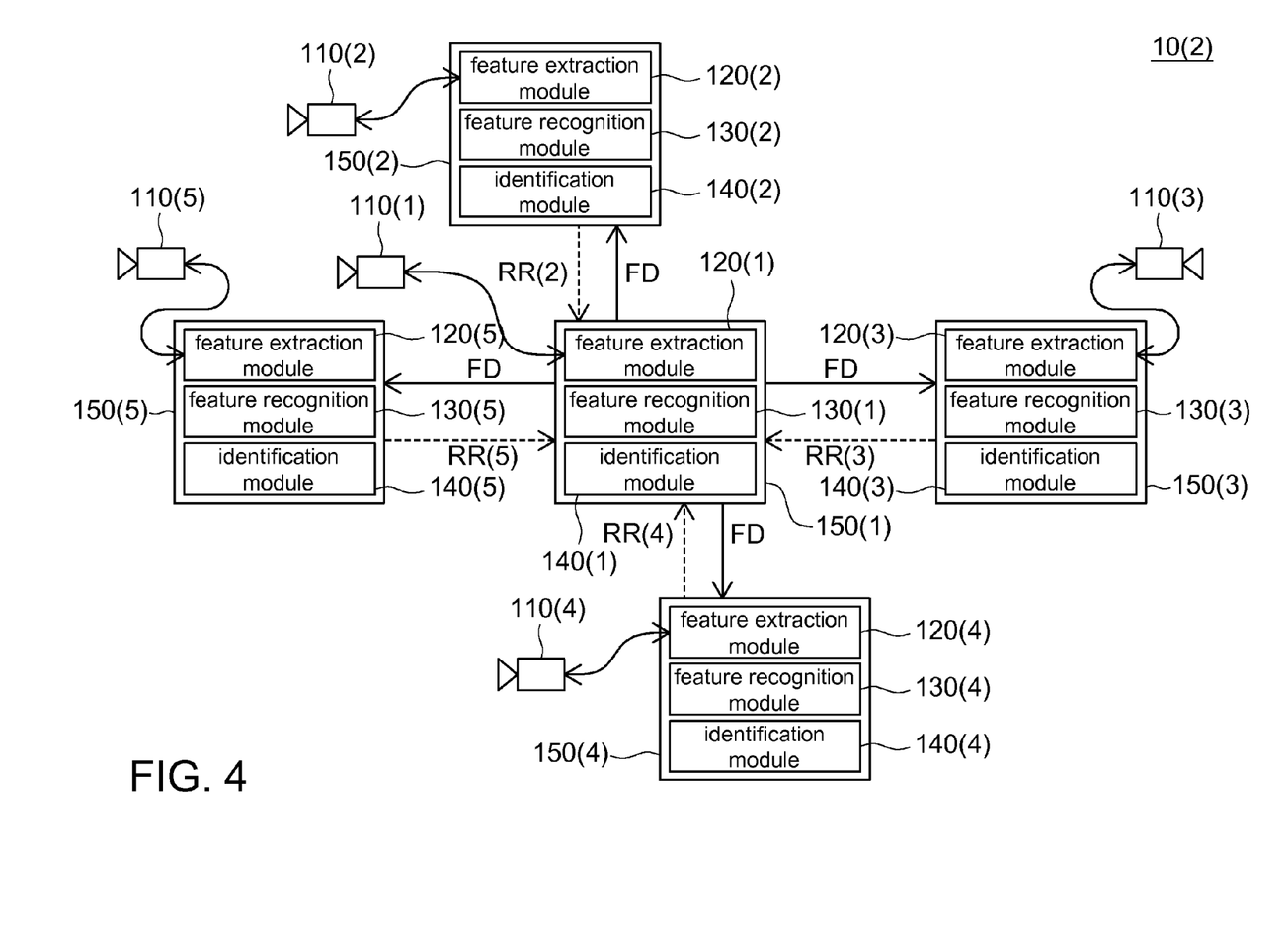
FIG. 4 shows a block diagram of a rapid facial recognition system according to a second embodiment of the invention.

FIG. 4 is a block diagram of a rapid facial recognition system according to a second embodiment of the invention. For the convenience of elaboration, in FIG. 4, the rapid facial recognition system 10 of FIG. 2 is replaced by the rapid facial recognition system 10 (2), which is exemplified by having five computing units and five image capture devices. However, the invention is not limited thereto, and the number of the computing units can be adjusted to fit actual needs. The rapid facial recognition system 10 (2) differs with the above-mentioned rapid facial recognition system 10 (1) in that the computing units 150 (2)~150 (5) are respectively coupled to the image capture devices 110 (2)~110 (5). In the present embodiment, the computing unit 150 (2) further includes a feature extraction module 120 (2) and an identification module 140 (2); the computing units 150 (3) further includes a feature extraction module 120 (3) and an identification module 140 (3); the computing units 150 (4) further includes a feature extraction module 120 (4) and an identification module 140 (4); the computing units 150 (5) further includes a feature extraction module 120 (5) and an identification module 140 (5).

The functions of the image capture devices 110 (2)~110 (5) are identical to that of the image capture device 110 (1), the functions of the feature extraction modules 120 (2)~120 (5) are identical to that of the feature extraction module 120 (1), the functions of the identification modules 140 (2)~140 (5) are identical to that of the identification module 140 (1), and the details of the functions are not repeated here. The computing units 150 (1)~150 (5) are respectively capable of using the image capture devices 110 (1)~110 (5) to capture a facial image, and the feature extraction modules 120 (1)~120 (5) are respectively capable of extracting features of the facial image to generate and broadcast a set of feature data. Therefore, each of the computing units 150 (1)~150 (5) can be used as a broadcasting feature computing unit. Thus, the computing unit which broadcasts the set of feature data is called a "broadcasting feature computing unit", and other computing units which receive the set of feature data and generate recognition results are called "response recognition computing units". Consequently, the computing units 150 (1)~150 (5) of the second embodiment play twofold roles as a broadcasting feature computing unit and a response recognition computing unit at the same time. Whether the computing units 150 (1)~150 (5) are used as broadcasting feature computing units or response recognition computing units depends on whether the computing units 150 (1)~150 (5) are either on the side of broadcasting the set of feature data or on the side of receiving the set of feature data and generating the recognition results.

For the convenience of elaboration, in FIG. 4, the computing unit 150 (1) is used as a broadcasting feature computing unit, and each of the computing units 150 (2)~150 (5) is used as a response recognition computing unit. In the second embodiment, the image capture device 110 (1) is called an "image capture device"; the image capture devices 110 (2)~110 (5) are called "other image capture devices"; the feature extraction module 120 (1) is called a "first feature extraction module"; the feature recognition module 130 (1) is called a "first feature recognition module"; the identification module 140 (1) is called a "first identification module"; the feature extraction modules 120 (2)~120 (5) are called "second feature extraction modules"; the feature recognition modules 130 (2)~130 (5) are called "second feature recognition modules"; the identification modules 140 (2)~140 (5) are called "second identification modules"; the recognition result RR (1) is called a "first recognition result"; the recognition results RR (2)~RR (5) are called "second recognition results".

After the image capture device 110 (1) captures a facial image, the first feature extraction module 120 (1) extracts features of the facial image to generate a set of feature data FD. The computing unit 150 (1) broadcasts the set of feature data FD to the computing units 150 (2)~150 (5). The computing unit 150 (1) is used as a broadcasting feature computing unit and the computing units 150 (2)~150 (5) are used as the response recognition computing units. Each of the first feature recognition module 130 (1) and the second feature recognition modules 130 (2)~130 (5) performs recognition in accordance with the set of feature data FD and the classes allocated to each of the feature recognition modules, so as to provide the first recognition result RR (1) and the second recognition results RR (2)~RR (5) to the first identification module 140 (1) of the broadcasting feature computing unit as a response. The first identification module 140 (1) further recognizes the first recognition result RR (1) and the second recognition results RR (2)~RR (5) to accomplish the recognition of an individual's identity.

Each of the computing units 150 (2)~150 (5) can also be used as a broadcasting feature computing unit. For example, when the other image capture device 110 (2) captures another facial image, the second feature extraction module 120 (2) extracts features of the another facial image captured by the other image capture device 110 (2) so as to generate and broadcast the other set of feature data to the computing units connected to the second feature extraction module 120 (2). Meanwhile, the computing units 150 (2) is used as a broadcasting feature computing unit, and the computing units which receive the set of feature data from the computing unit 150 (2) and further generate the recognition result are used as response recognition computing units.

For example, the other set of feature data is broadcasted to the first feature recognition module 130 (1), the first feature recognition module 130 (1) performs rapid facial recognition in accordance with the other set of feature data and the classes allocated to the first feature recognition module 130 (1) for rapidly generating a third recognition result. The second feature recognition module 130 (2) performs rapid facial recognition in accordance with the other set of feature data and the classes allocated to the second feature recognition module 130 (2) for rapidly generating a fourth recognition result. The second identification module 140 (2) recognizes the third recognition result and the fourth recognition result to accomplish the recognition of an individual's identity. Although FIG. 4 does not depict that the second feature extraction module 120 (2) broadcasts the other set of feature data to a plurality of feature recognition modules, according to the above disclosure, the second feature extraction module 120 (2) can broadcast the other set of feature data to a plurality of feature recognition modules which are connected to the network via the second feature extraction module 120 (2). The feature recognition modules generate a plurality of fourth recognition results to the second identification module 140 (2) so that the second identification module 140 (2) further recognizes the third recognition result and the fourth recognition results to accomplish the recognition of an individual's identity.

Third Embodiment

Figure 5:
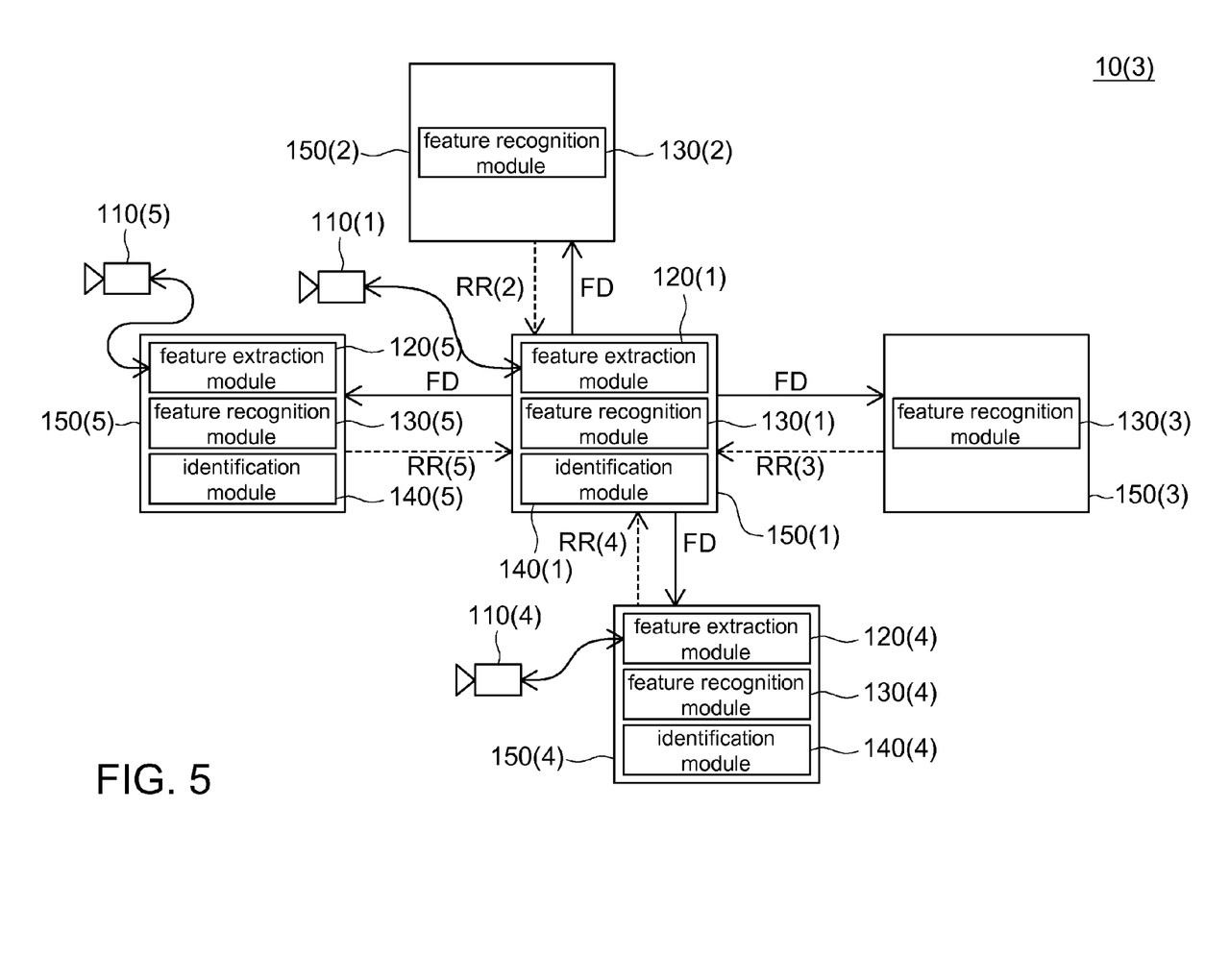
FIG. 5 shows a block diagram of a rapid facial recognition system according to a third embodiment of the invention.

FIG. 5 is a block diagram of a rapid facial recognition system according to a third embodiment of the invention. Referring to FIG. 5, the rapid facial recognition system 10 (3) differs with the abovementioned rapid facial recognition system 10 (1) in that the computing units 150 (4) and 150 (5) are respectively coupled to the image capture devices 110 (4) and 110 (5). In the present embodiment, the computing unit 150 (4) further includes a feature extraction module 120 (4) and an identification module 140 (4); the computing unit 150 (5) further includes a feature extraction module 120 (5) and an identification module 140 (5).

As the computing units 150 (1), 150 (4) and 150 (5) are respectively capable of using the image capture devices 110 (1), 110 (4) and 110 (5) to captures a facial image and the feature extraction module 120 (1), 120 (4) and 120 (5) are respectively capable of extracting features of the facial image to generate and broadcast a set of feature data, each of the computing units 150 (1), 150 (4), and 150 (5) can be used as a broadcasting feature computing unit. Thus, the computing unit which broadcasts the set of feature data is called a "broadcasting feature computing unit", and other computing units which receive the set of feature data and generate the recognition results are called "response recognition computing units". Therefore, the computing units 150 (1), 150 (4), and 150 (5) of the third embodiment play twofold roles as a broadcasting feature computing unit and a response recognition computing unit at the same time, but the computing units 150 (2) and 150 (3) can only be used as a response recognition computing unit. Whether the computing units 150 (1), 150 (4), and 150 (5) are used as broadcasting feature computing units or response recognition computing units depends on whether the computing units 150 (1), 150 (4), and 150 (5) are either on the side of broadcasting the set of feature data or on the side of receiving the set of feature data and generating the recognition results.

For the convenience of elaboration, in FIG. 5, the computing unit 150 (1) is used as a broadcasting feature computing unit, and each of the computing units 150 (2)~150 (5) is used as a response recognition computing unit. After the image capture device 110 (1) captures a facial image, the first feature extraction module 120 (1) extracts features of the facial image to generate a set of feature data FD. The computing units 150 (1) broadcasts the set of feature data FD to the computing units 150 (2)~150 (5). The computing units 150 (1) is used as a broadcasting feature computing unit and the computing units 150 (2)~150 (5) are used as response recognition computing units. The first feature recognition module 130 (1) and the second feature recognition modules 130 (2)~130 (5) perform recognition in accordance with the set of feature data FD and the classes allocated to the feature recognition modules, so as to provide the first recognition result RR (1) and the second recognition results RR (2)~RR (5) to the first identification module 140 (1) of the broadcasting feature computing unit. The first identification module 140 (1) further recognizes the first recognition result RR (1) and the second recognition results RR (2)~RR (5) to accomplish the recognition of an individual's identity.

The computing units 150 (4) and 150 (5) can also be used as a broadcasting feature computing unit. For example, when the other image capture device 110 (5) captures another facial image, the second feature extraction module 120 (5) extracts features of the another facial image captured by the other image capture device 110 (5) so as to generate and broadcast the other set of feature data to the computing units connected to the second feature extraction module 120 (5). Meanwhile, the computing units 150 (5) is used as a broadcasting feature computing unit, and the computing units which receive the set of feature data from the computing unit 150 (5) and further generate the recognition result are response recognition computing units.

Figure 6:
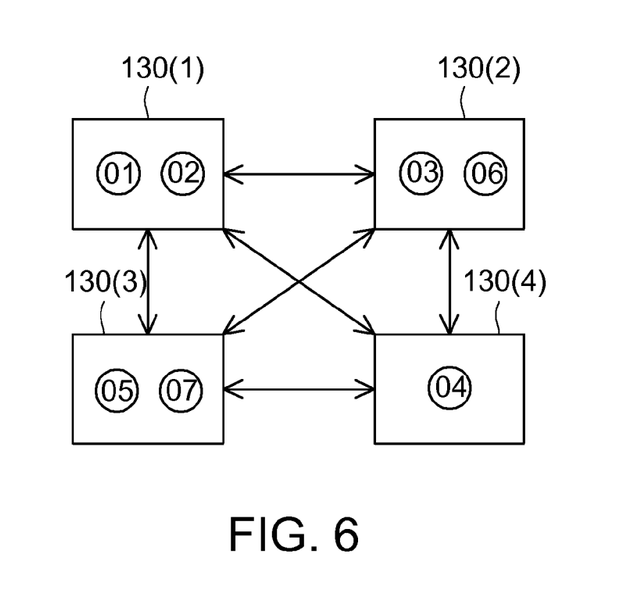
FIG. 6 shows a plurality of classes allocated to a feature recognition module.

FIG. 6 illustrates a plurality of classes allocated to a feature recognition module. It can be viewed as a portion of FIG. 2. For convenience of elaboration, in FIG. 6, the classes O1~O7 are allocated to the feature recognition modules 130 (1)~130 (4). However, the invention is not limited thereto, and the number of the class and the number of the feature recognition module can be adjusted to fit actual needs, and the way of allocating the classes to the feature recognition module can be also adjusted to fit actual needs. In FIG. 6, the system allocates classes by the use of the roughly average method. The feature recognition module 130 (1) has two classes O1 and O2. The feature recognition module 130 (2) has two classes O3 and O6. The feature recognition module 130 (3) has two classes O5 and O7. The feature recognition module 130 (4) has the class O4. The feature recognition module 130 (1) determines whether the set of feature data FD belongs to the class O1 or the class O2. If yes, recognition can be done successfully, and the recognition result RR (1) is provided to the first identification module 140; otherwise, recognition cannot be done, and non recognition result is provided to the first identification module 140. A successful recognition result includes the information of the class as well as other information such as person's ID and attributes, camera position, camera time, broadcasted set of feature data ID, recognition time, IP of the response recognition computing unit, and so on. However, the information of the recognition results of the invention is not limited to the above exemplification, and the contents of the information can be adjusted to fit actual needs. Also, of the recognition results, the data related to camera position, camera time and coordinates are referred as space-time recognition data in the invention. Likewise, the feature recognition modules 130 (2)~130 (4) determine whether the set of feature data FD belongs to the class allocated to the feature recognition modules. If yes, recognition can be done successfully, and the recognition result is provided; otherwise, recognition cannot be done, and non recognition result is provided.

For example, when the feature recognition module 130 (2) determines that the set of feature data belongs to the class O3, the class O3 is the specific class corresponding to the set of feature data, and other classes such as classes O1, O2, O4, O5, O6 and O7 are the classes not corresponding to the set of feature data and are also called non-specific classes. When the feature recognition module 130 (2) determines that the set of feature data belongs to the class O3, this implies that the feature recognition module 130 (2) is successful in face recognition.

Similarly, when the feature recognition module 130 (1) determines that the set of feature data belongs to the class O1, the class O1 is the specific class corresponding to the set of feature data, and other classes such as classes O2~O7 are the classes not corresponding to the set of feature data and are also called non-specific classes. When the feature recognition module 130 (1) determines that the set of feature data belongs to the class O1, this implies that the feature recognition module 130 (1) is successful in face recognition. The feature recognition module 130 (1) is called a "first feature recognition module", and the feature recognition module 130 (2) is called a "second feature recognition module".

Figure 7:
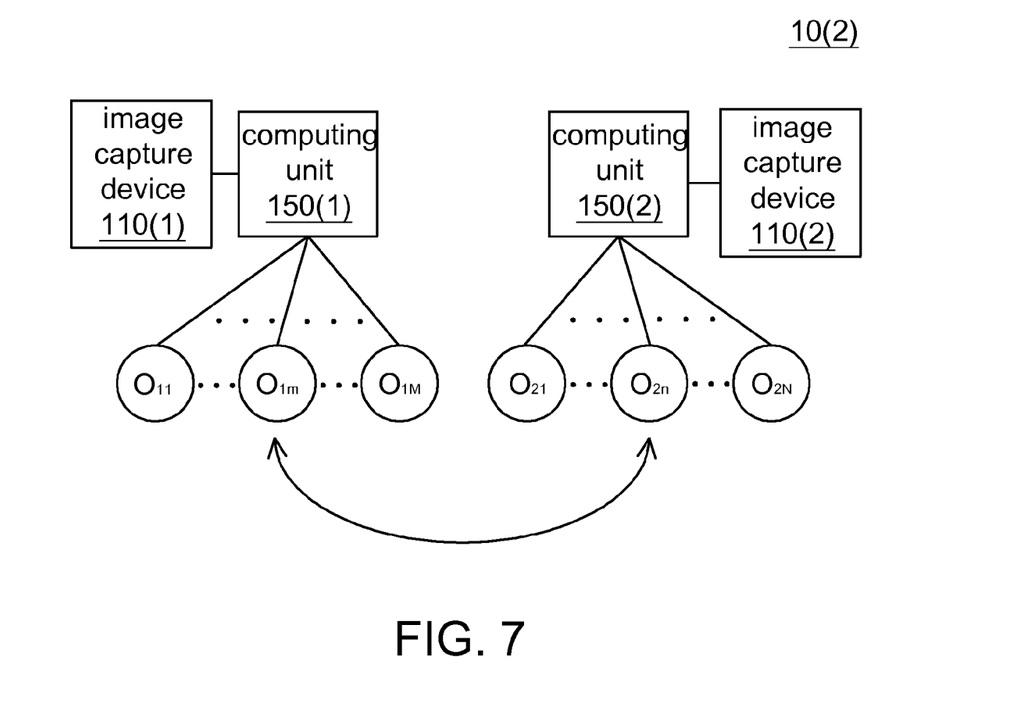
FIG. 7 shows the exchange of classes between two computing units.

Class Exchange and Reallocation:

Before the system is operated, each face data in the face database is regarded as different classes, and all classes are allocated to the network-connected computing units having feature recognition modules by the use of the roughly average method. After the system starts operation, classes are exchanged and reallocated due to the consideration of system efficiency and balance of the computing load. If system efficiency and balance of the computing load are not considered, then there is no need to exchange and reallocate the classes. FIG. 7 depicts the exchange of classes between two computing units, wherein the classes are reallocated by way of exchange. For the convenience of elaboration, in FIG. 7, the exchange of classes is exemplified by an image capture device 110 (1), an image capture device 110 (2), a computing unit 150 (1) and a computing unit 150 (2). The image capture device 110 (1) is connected to the computing unit 150 (1), and the image capture device 110 (2) is connected to the computing unit 150 (2), wherein, the camera position of the image capture device 110 (1) is denoted by $(x_{10}, y_{10})$, and the camera position of the image capture device 110 (2) is denoted by $(x_{20}, y_{20})$. The classes $O_{11}$~$O_{1M}$ are allocated to the feature recognition module of the computing unit 150 (1), and the classes $O_{21}$~$O_{2N}$ are allocated to the feature recognition module of the computing unit 150 (2), wherein, the classes $O_{11}$, $O_{1m}$, $O_{1M}$, $O_{21}$, $O_{2n}$ and $O_{2N}$ respectively have a corresponding set of previous space-time recognition data. The space-time recognition data, such as the camera position and the image capture time, respectively are denoted by $(x_{11}, y_{11}, t_{11})$, $(x_{1m}, y_{1m}, t_{1m})$, $(x_{1M}, y_{1M}, t_{1M})$, $(x_{21}, y_{21}, t_{21})$, $(x_{2n}, y_{2n}, t_{2n})$ and $(x_{2N}, y_{2N}, t_{2N})$, wherein, $(x_{11}, y_{11})$, $(x_{1m}, y_{1m})$, $(x_{1M}, y_{1M})$, $(x_{21}, y_{21})$, $(x_{2n}, y_{2n})$ and $(x_{2N}, y_{2N})$ respectively denote the previous camera position related to the classes $O_{11}$, $O_{1m}$, $O_{1M}$, $O_{21}$, $O_{2n}$ and $O_{2N}$, and $t_{11}$, $t_{1m}$, $t_{1M}$, $t_{21}$, $t_{2n}$ and $t_{2N}$ respectively denote the previous image capture time related to the classes $O_{11}$, $O_{1m}$, $O_{1M}$, $O_{21}$, $O_{2n}$ and $O_{2N}$.

When the class of a set of feature data FD is categorized by the feature recognition module of the computing unit 150 (2) as $O_{2n}$, and the camera position is $(x_{10}, y_{10})$, this implies that the feature recognition module of the computing unit 150 (2) successfully recognizes that the set of feature data matches the class $O_{2n}$ allocated to the feature recognition module; however, the camera position is located at the image capture device 110 (1) connected to the computing unit 150 (1). The class $O_{2n}$ is a specific class corresponding to the set of feature data FD, and other classes such as classes $O_{11}$, $O_{1m}$, $O_{1M}$, $O_{21}$ and $O_{2N}$ are not corresponding to the set of feature data FD. In other words, the classes $O_{11}$, $O_{1m}$, $O_{1M}$, $O_{21}$ and $O_{2N}$ are non-specific classes.

When the facial image captured by the image capture device 110 (1) is successfully recognized by the computing unit 150 (2), this implies that the person identified is near the camera position $(x_{10}, y_{10})$ rather than the camera position $(x_{20}, y_{20})$. Meanwhile, the system provides the computing units with the function of class exchange. According to the method, the computing unit 150 (2) transfers the class $O_{2n}$ to the computing unit 150 (1) and exchanges for one of the classes allocated to the computing unit 150 (1), so as to increase successful recognition speed for the next recognition. According to the method for selecting the to-be-exchanged class of the computing unit 150 (1), the class whose previous camera position is the farthest from the current camera position $(x_{10}, y_{10})$ among all classes of the computing unit 150 (1) is selected in accordance with the previous set of space-time recognition data $(x_{11}, y_{11}, t_{11})$, $(x_{1m}, y_{1m}, t_{1m})$, $(x_{1M}, y_{1M}, t_{1M})$. The calculation of distance is expressed as the following formulas:

$$D_{ijk} = \sqrt{(x_{ij}-x_{k0})^2+(y_{ij}-y_{k0})^2},$$

wherein D denotes distance, $x_{ij}$ and $y_{ij}$ denote the camera position of the j-th class previous space-time recognition data of the i-th computing unit, and $x_{k0}$ and $y_{k0}$ denote the current camera position of the person. If the calculation result demonstrates that $$D_{1m1} = \underset{i=1\ldots M}{\text{Max}}(D_{1i1}),$$

that is, the class $O_{1m}$ whose previous camera position ($x_{1m}$, $y_{1m}$) is the farthest away from the current camera position ($x_{10}, y_{10}$) among all classes of the computing unit 150 (1), then the class $O_{2n}$ is exchanged for the class $O_{1m}$. That is, when the action of class exchange needs to be performed, the feature recognition module of the computing unit 150 (2) exchanges the specific class $O_{2n}$ for the class $O_{1m}$ which is one of the non-specific classes of the feature recognition module of the computing unit 150 (1), wherein, the class $O_{1m}$ is the class whose previous camera position is the farthest from the current camera position among the classes $O_{11}$~$O_{1M}$ of the feature recognition module of the computing unit 150 (1). The feature recognition module of the computing unit 150 (2) is called a "second feature recognition module", and the feature recognition module of the computing unit 150 (1) is called a "first recognition module".

Moreover, the system also adopts the least total distance method for any two computing units to perform reallocation according to the following formulas when needed:

$$\text{Min} \sum C_{ijk} \times D_{ijk} \quad (1)$$

$$\text{S.T} \sum_k C_{ijk} = 1 \quad (2)$$

$$\sum_{ij} C_{ijk} = \left\lfloor \frac{1}{2} \sum_{ijk} C_{ijk} \right\rfloor \text{ or } \sum_{ij} C_{ijk} = \left\lceil \frac{1}{2} \sum_{ijk} C_{ijk} \right\rceil \quad (3)$$

wherein, $D_{ijk} = \sqrt{(x_{ij}-x_{k0})^2+(y_{ij}-y_{k0})^2}$, $$C_{ijk} = \begin{cases} 1 & \text{if } O_{ij} \in \text{Node } k \text{ (if } Oij \text{ is allocated to the } k\text{-th computing unit)} \\ 0 & \text{if } O_{ij} \notin \text{Node } k \text{ (if } Oij \text{ is allocated to the } k\text{-th computing unit)} \end{cases}$$

Formula (1) is subjected to formula (2) and formula (3). According to the least total distance method, classes can be equally allocated to two computing units. The two computing units can be two first recognition modules, or two second recognition modules, or one first recognition module and one second recognition module.

In the above disclosure of the rapid facial recognition system 10 (2), two computing units are used for exemplification. However, anyone who is skilled in the technology of the invention can also use more than two computing units in facial recognition. By use of the above similar distance calculation formulus denote D, the computing units connected via the network can be divided into several groups according to their distances. Firstly, the set of feature data FD is broadcasted to the nearest group. If recognition is failed, then, the set of feature data FD is broadcasted to the next nearest group for performing recognition. By the same token, the set of feature data FD is broadcasted to the next nearest group until a feature recognition module is successful in face recognition or the broadcasting feature computing unit has finished broadcasting to all groups. Thus, the use of the bandwidth of the network can be largely decreased.

Identifies the Recognition Results:

Referring to FIG. 2, the abovementioned rapid facial recognition system 10 further identifies the recognition results RR (1)~RR (N) through the identification module 140 to increase the recognition accuracy. For example, when the set of feature data FD is allocated to a specific class of the feature recognition module 130 (2), this implies that the feature recognition module 130 (2) has successfully identified the set of feature data. The feature recognition module 130 (2) provides the current recognition result RR (2) as well as a set of previous space-time recognition data of the specific class to the identification module 140. Thus, the identification module 140 is able to increase the accuracy of the recognition result RR (2) in accordance with the set of previous space-time recognition data. Similarly, when the set of feature data FD is allocated to a specific class of the feature recognition module 130 (1), this implies that the feature recognition module 130 (1) has successfully identified the set of feature data. The feature recognition module 130 (1) provides the recognition results RR (1) as well as a set of previous space-time recognition data of the specific class to the identification module 140. Thus, the identification module 140 is able to increase the accuracy of the recognition result RR (1) in accordance with the set of previous space-time recognition data.

The feature recognition module 130 (1) is called a "first feature recognition module". The feature recognition module 130 (2) is called a "second feature recognition module". The identification module 140 is called a "first identification module". The recognition results RR (1) is called a "first recognition result". The recognition results RR (2)~RR (N) are called "second recognition results".

Furthermore, the set of previous space-time recognition data includes a previous camera position and a previous image capture time. The identification module 140 calculates a motion speed according to the previous camera position, the current camera position, and the image capture time. If the motion speed is not reasonable, the identification module 140 discards the recognition results RR (2), and responds the exclusion to the feature recognition module 130 (2) having the specific class so that the feature recognition module 130 (2) updates the recognition record data of related classes.

In addition to identifying the recognition result in accordance with the set of previous space-time recognition data, the identification module 140 can also be connected to external data such as the attendance record so as to determine whether the personnel is on leave or on business trip. If the personnel is on leave or on business trip, then the identification module 140 excludes the recognition result RR (2). No matter the identification module 140 identifies the recognition results in accordance with the set of previous space-time recognition data or the attendance record, the recognition accuracy of the rapid facial recognition system is further improved.

Figure 8:
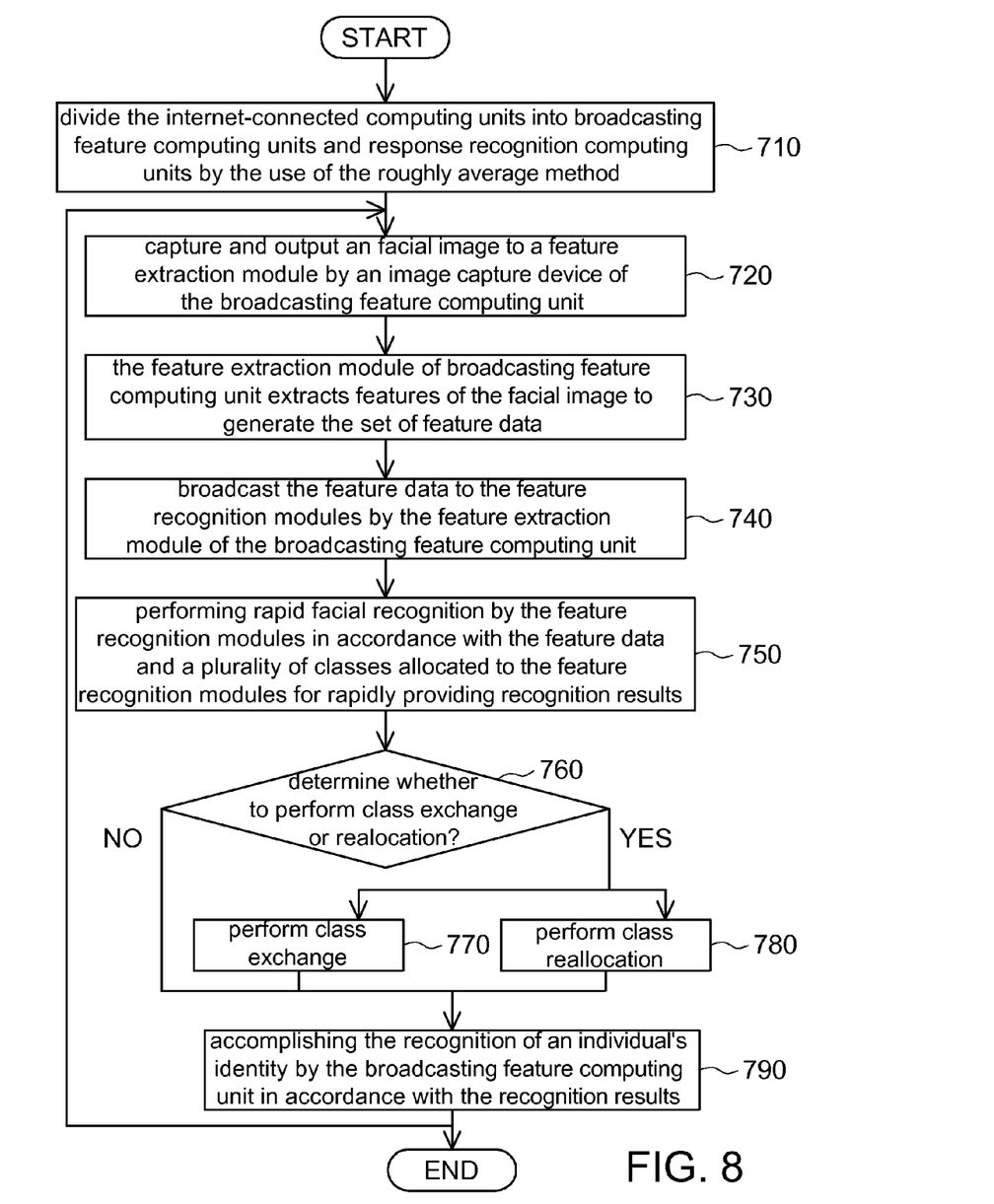
FIG. 8 shows a flowchart of rapid facial recognition method according to a preferred embodiment of the invention.

Rapid Facial Recognition Method:

Referring to FIG. 2 and FIG. 8. FIG. 8 is a flowchart of rapid facial recognition method according to a preferred embodiment of the invention. The rapid facial recognition method can be used in the abovementioned rapid facial recognition system 10. The rapid facial recognition method includes the following steps:

Firstly, the method proceeds to step 710, before the system is operated, each face data in the face database is regarded as different class, and all classes are allocated to the computing units, which are connected via the network and have the feature recognition modules, by the roughly average method. The computing units are further divided into two categories, namely, the broadcasting feature computing units and the response recognition computing units. The image capture device 110, the feature extraction module 120, the feature recognition module 130 (1) and the identification module 140 are located at the broadcasting feature computing unit, and the feature recognition modules 130 (2)~130 (N) are located at the response recognition computing units respectively. When the system starts operation, the method proceeds to step 720, a facial image is captured by the image capture device 110 of the broadcasting feature computing unit and outputted to the feature extraction module 120. Next, the method proceeds to step 730, the feature extraction module 120 of the broadcasting feature computing unit extracts features of the facial image to generate a set of feature data. Then, the method proceeds to step 740, the set of feature data is broadcasted to the feature recognition modules 130 (1)~130 (N) by the feature extraction module 120 of the broadcasting feature computing unit. After that, the method proceeds to step 750, recognition is performed by the feature recognition modules 130 (1)~130 (N) in accordance with the set of feature data and the classes allocated so as to generate the recognition results RR (1)~RR (N). Step 750 further includes determining whether the set of feature data FD is categorized to a specific class. If one of the feature recognition modules 130 (1)~130 (N) recognizes the set of feature data as a specific class, this implies that the feature recognition module is successful in face recognition. If recognition is successfully done, the feature recognition module generates related recognition results and transmits out a set of previous space-time recognition data of this specific class. If recognition is failed, it generates non recognition result. The determination in step 760 is based on whether the recognition result is successful or failed, and whether the user would like to perform class exchange or reallocation. As indicated in step 760, if class exchange or reallocation is required, then the method proceeds to step 770 or 780, and if class exchange or reallocation is not required, then the method proceeds to step 790 directly. Step 780 of reallocation does not have to come after step 750, it can come after step 790 if necessary. The process of class exchange or reallocation is similar to that of the abovementioned process of class exchange and reallocation, and is not repeated here. The feature extraction module can broadcast the set of feature data to all of the feature recognition modules 130 (1)~130 (N) or adopt the method of grouping and broadcasting the set of feature data. The computing units connected via the network are divided into several groups according to their distances. The set of feature data is broadcasted to the nearest group first. If recognition is failed, the set of feature data FD is broadcasted to the next nearest group for recognition. If recognition in the next nearest group is failed, the set of feature data FD is broadcasted to the further next nearest group for recognition. The process above is repeated until the feature recognition module is successful in face recognition or has finished broadcasing to all groups. Lastly, the method proceeds to step 790, the identification module 140 of the broadcasting feature computing unit identifies the recognition results RR (1)~RR (N) to accomplish the recognition of an individual's identity. In step 790, the accuracy of the recognition results RR (1)~RR (N) can further be improved in accordance with the set of previous space-time recognition data provided from the feature recognition module which is successful in recognition in step 750. In addition, the identification module can also be connected to other external data such as the data of attendance record, and further improve the accuracy of the current recognition results RR (1)~RR (N) according to the attendance record. Then, steps 720~790 are repeated again.

The operations of a plurality of feature recognition modules, feature extraction modules and identification modules are similar to that disclosed in the second embodiment and the third embodiment, and are not repeated here.

According to the system and the method for performing rapid facial recognition disclosed in the embodiments of the invention, distributed facial recognition is performed by multiple interconnected feature recognition modules scattered on the network, hence can greatly increase the recognition speed and decrease the requirements in hardware specification. Moreover, the recognition accuracy is further increased by employing an identification module to identify the recognition results.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rapid facial recognition system, for performing recognition according to a plurality of classes, comprising:
at least an image capture device used for capturing a facial image;
a plurality of response recognition computing units, each of which further comprising:
a second feature recognition module having a part of the plurality of classes performs rapid facial recognition in accordance with a set of feature data and the part of the plurality of classes allocated to the second feature recognition module for generating a second recognition result as a response; and
at least a broadcasting feature computing unit connected to the plurality of the response recognition computing units via the network, further comprising:
a first feature recognition module having the other part of the plurality of classes, performs rapid facial recognition in accordance with the set of feature data and the other part of the plurality of classes allocated to the first feature recognition module for generating a first recognition result as a response;
a first feature extraction module used for extracting features of the facial image to generate the set of feature data and further broadcast the set of feature data to the first feature recognition module and the plurality of second feature recognition modules; and
a first identification module used for identifying the first recognition result and the plurality of second recognition results to accomplish the recognition of an individual's identity;
wherein the plurality of response recognition computing units are divided into a plurality of groups in accordance with the distance between the plurality of response recognition computing units and the broadcasting feature computing unit; and the broadcasting feature computing unit broadcasts the set of feature data to the nearest group first, and if the recognition fails, then the broadcasting feature computing unit broadcasts the set of feature data to the next nearest group until the second feature recognition module of one of the plurality of response recognition computing units is successful in face recognition, or the first feature extraction module has finished broadcasting to all the plurality of groups.

2. The rapid facial recognition system according to claim 1, wherein the fact that when the second feature recognition module categorizes the set of feature data to a specific class of the plurality of classes, implies that the second feature recognition module is successful in face recognition, and the fact that when the first feature recognition module categorizes the set of feature data to a specific class of the plurality of classes, implies that the first feature recognition module is successful in face recognition.

3. The rapid facial recognition system according to claim 2, wherein when the second feature recognition module is successful in face recognition, the second feature recognition module not only generates the second recognition result, but also sends a set of previous space-time recognition data of the specific class as a response, and when the first feature recognition module is successful in face recognition, the first feature recognition module not only generates the first recognition result, but also sends a set of previous space-time recognition data of the specific class as a response.

4. The rapid facial recognition system according to claim 3, wherein the set of previous space-time recognition data is the coordinate data of time and space related to a previous recognition result of the specific class.

5. The rapid facial recognition system according to claim 3, wherein the first identification module further performs recognition in accordance with the set of previous space-time recognition data of the specific class, the current first recognition result and the plurality of the second recognition results.

6. The rapid facial recognition system according to claim 2, wherein the first identification module is further connected to a set of attendance data, which comprises an attendance record of the specific class, and the first identification module further recognizes the first recognition result and the plurality of second recognition results in accordance with the attendance record related to the specific class.

7. The rapid facial recognition system according to claim 1, wherein the plurality of classes are distributed by a roughly average method to the first feature recognition module and the plurality of second feature recognition modules.

8. The rapid facial recognition system according to claim 2, wherein when the second feature recognition module is successful in face recognition and when there is a need to perform the action of class exchange, the second feature recognition module performs exchange between the specific class and a class of the non-specific classes of the first feature recognition module.

9. The rapid facial recognition system according to claim 8, wherein the class of the non-specific classes of the first feature recognition module that is performed exchange with the specific class of the second feature recognition module, is the class whose previous camera position is the farthest away from the current camera position among all non-specific classes of the first feature recognition module.

10. The rapid facial recognition system according to claim 1, wherein when the plurality of classes need to be reallocated, the rapid facial recognition system adopts the least total distance method to provide the first feature recognition module of the broadcasting feature computing unit and the plurality of second feature recognition modules of the response recognition computing units, either first feature recognition module and one of the second feature recognition modules, or any two of the second feature recognition modules for performing class reallocation.

11. The rapid facial recognition system according to claim 1, further comprising another first feature recognition module, wherein when the plurality of classes need to be reallocated, the rapid facial recognition system adopts the least total distance method to provide the first feature recognition module and the another first feature recognition module for performing class reallocation.

12. The rapid facial recognition system according to claim 1, further comprising another image capture device for capturing another facial image, wherein each of the plurality of response recognition computing units further comprises a second feature extraction module for extracting features of the another facial image to generate and broadcast another set of feature data; the first feature recognition module performs rapid facial recognition in accordance with the another set of feature data and the other part of the plurality of classes allocated to the first feature recognition module for generating a third recognition result as a response; and each of the second feature recognition module performs rapid facial recognition in accordance with the another set of feature data and the part of the plurality of classes allocated to each second feature recognition module for generating a fourth recognition result as a response.

13. The rapid facial recognition system according to claim 1, wherein each of the plurality of response recognition computing units comprises:
a second identification module used for identifying the third recognition result and the plurality of fourth recognition results to accomplish the recognition of an individual's identity.

14. A rapid facial recognition method for performing recognition in accordance with a plurality of classes, comprising:
dividing a plurality of computing units connected via the network into at least a broadcasting feature computing unit and a plurality of response recognition computing units;
capturing a facial image by the broadcasting feature computing unit;
extracting features of the facial image to generate a set of feature data by the broadcasting feature computing unit;
broadcasting the set of feature data, by the broadcasting feature computing unit, to the feature recognition modules of the broadcasting feature computing unit, and to the plurality of feature recognition modules of the plurality of response recognition computing units;
performing rapid facial recognition by the plurality of feature recognition modules in accordance with the set of feature data and the plurality of classes allocated to the plurality of feature recognition modules for generating a plurality of recognition results as a response; and further sending a set of previous space-time recognition data related to a specific class when face recognition is successfully accomplished; and
accomplishing the recognition of an individual's identity by the broadcasting feature computing unit in accordance with the recognition results and the set of previous space-time recognition data of the specific class;
wherein the step of broadcasting the set of feature data to the broadcasting feature computing unit and a plurality of feature recognition modules of the plurality of response recognition computing units further comprises:
dividing the plurality of response recognition computing units into a plurality of groups in accordance with the distance between the plurality of response recognition computing units and the broadcasting feature computing unit;

broadcasting the set of feature data to the nearest group by the broadcasting feature computing unit; and if recognition fails, broadcasting the set of feature data to the next nearest group until the second feature recognition module of one of the response recognition computing units is successful in face recognition or the first feature extraction module has finished broadcasting to all the plurality of groups.

15. The rapid facial recognition method according to claim 14, wherein the steps of performing rapid facial recognition in accordance with the set of feature data and the plurality of classes allocated to the plurality of feature recognition modules further comprises:

determining whether the set of feature data is categorized in the specific class of the plurality of classes; and implying that the action succeeds in facial recognition when one of the feature recognition modules categorizes the set of feature data as the specific class.

16. The rapid facial recognition method according to claim 14, wherein the step of accomplishing the recognition of an individual's identity in accordance with the recognition results and the set of previous space-time recognition data of the specific class further comprises:

connecting a set of attendance data comprising an attendance record of the specific class, and recognizing the plurality of recognition results in accordance with the attendance record of the specific class.

17. The rapid facial recognition method according to claim 14, further comprising: allocating the plurality of classes to the feature recognition modules by a roughly average method.

18. The rapid facial recognition method according to claim 15, wherein when the action succeeds in facial recognition, the method further comprises:

determining if it is necessary to exchange the plurality of classes allocated to the feature recognition modules; and if it is, performing exchange action between the specific class and a class of the non-specific classes of the feature recognition module of the broadcasting feature computing unit, by the feature recognition modules of the response recognition computing units.

19. The rapid facial recognition method according to claim 18, wherein the exchanged class of the non-specific classes is the class whose previous camera position is the farthest away from the current camera position among all the non-specific classes of the feature recognition module of the broadcasting feature computing unit.

20. The rapid facial recognition method according to claim 14, further comprising:

determining if it is necessary to reallocate the plurality of classes allocated to the feature recognition modules; and if it is, providing any two of the feature recognition modules by adopting the least total distance method for performing class reallocation.

* * * * *